UNITED STATES PATENT OFFICE.

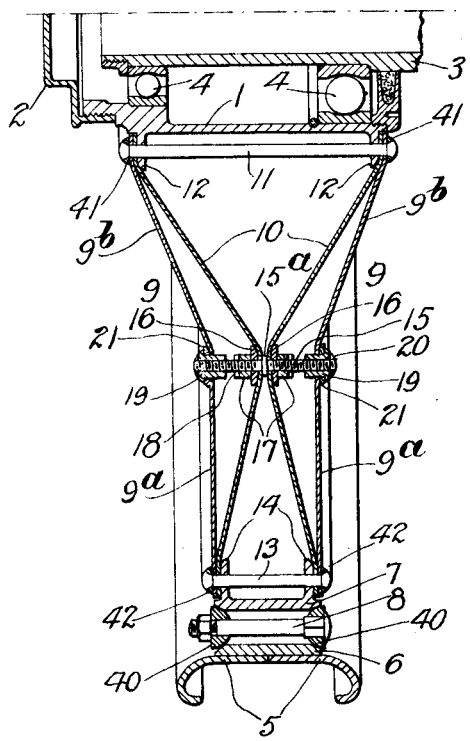
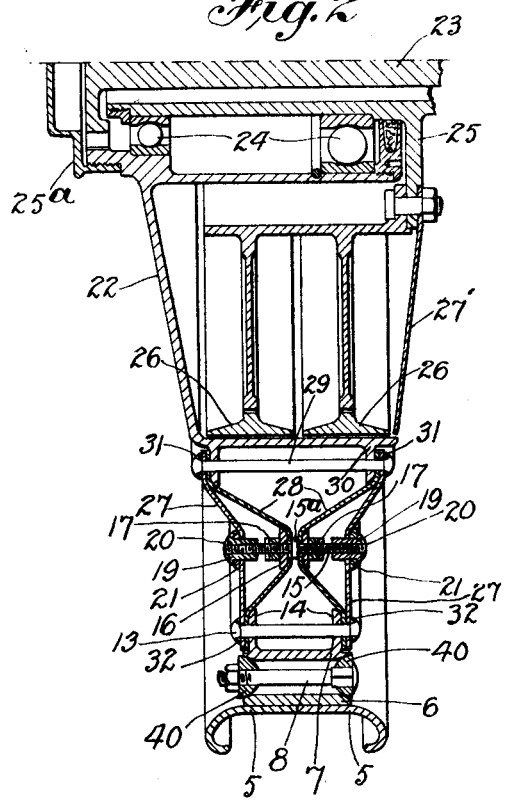

WILLIAM J. P. MOORE, OF NEW YORK, N. Y.

WHEEL.

1,172,624.         Specification of Letters Patent.         Patented Feb. 22, 1916.

Application filed July 1, 1915. Serial No. 37,411.

*To all whom it may concern:*

Be it known that I, WILLIAM J. P. MOORE, a citizen of the United States, residing at New York, in the county of New York and State of New York, have invented certain new and useful Improvements in Wheels, of which the following is a specification, reference being had therein to the accompanying drawing.

This invention relates to certain new and useful improvements in tension wheels.

The object is to provide a simpler and more efficient construction, which will be stiff and unyielding, exceedingly durable because of the braced construction, and easy to put together or take apart.

The invention consists essentially in the construction and combination of parts, substantially as will be hereinafter described and then more particularly pointed out in the claims.

In the accompanying drawing illustrating my invention: Figure 1 is a vertical section of my improved tension wheel; Fig. 2 is a similar vertical section of a form of the wheel which includes a brake drum.

Similar characters of reference designate corresponding parts throughout the different figures of the drawing.

In referring to the particular style of wheel and the use to which it is put, the view in Fig. 1 depicts my invention as applied to a wheel to be used commonly as the front wheel, or driven wheel, of an automobile, the same having the hub 1, on which is a cap 2, while 3 denotes the axle, and 4 the ball bearings within the hub. The rim of the wheel may be of the demountable type, having clencher sections 5, clencher band 6, inner ring 7, perforated locking rings 40 and clamping bolts 8 for holding the parts together in the usual way. It will be noted, however, that in the present application I am not laying claim to any of the features of the demountable rim, nor to the hub and axle mechanism, but only to the bracing construction of plates or disks and other parts that lie between the hub and the rim, which parts I shall now proceed to describe in detail.

In the combination shown in Fig. 1, I employ two outer bent annular disks 9, between which are two other cone-shaped annular disks 10. The inner peripheral edges of these four disks are secured by bolts or rivets 11 to the flanges 12 on the inside of hub 1, there being washer rings 41 interposed between the outer heads of rivets 11 and the adjoining edges of the disks, into which washer rings the rivet heads are countersunk; while the outer peripheral edges of disks 9 and 10 are secured by the bolts or rivets 13 to the flanges 14 on the inner ring 7 of the demountable rim, washer rings 42 being similarly inserted between heads of rivets 13 and the disks. The outer annular disks 9 are bent, as already stated, the bending being near the middle points of their radii, so that their outer portions 9ª lie substantially parallel to each other, while their inner portions 9ᵇ are flared toward the hub. The inner annular disks 10 are cone-shaped, the apexes of their conical forms being near the middle points of their radii and opposite the central bent portions of the outer disks 9.

Through the bendings of the outer disks 9 and the conical central portions of the inner disks 10 pass clamping bolts 15. These bolts have at their central points an integral collar 15ª, which lies between the contiguous apexes of the two conical disks 10. The bolts 15 are screw-threaded from end to end. Against the conical disks 10 and inside thereof at points on the other side of said disks from where the collars 15ª are located, I place washer rings 16 and, against these washer rings, nuts 17 having slots 18 are screwed up tightly so as to press the washers 16 toward the disks 10 and toward the collar 15ª until the requisite tension is secured. Also nuts 19, having internally screw-threaded passages, pass through openings in the outer disks 9 and engage the opposite ends of the bolts 15, said nuts 19 having slots 20 in the outer ends thereof by which they may be handled with a screw driver or a wrench, and further, it is found convenient to interpose washer rings 21 between the flanged outer ends of the nuts 19 and the adjacent faces of the disks 9. By screwing the nuts 19 tightly upon the ends of the bolts 15, the disks 9 will be forced inward with firmness and under sufficient tension, the washers 21 furnishing a good bearing between the nuts 19 and the disks 9 and serving to distribute the tension uniformly throughout the disk. In the assembling of the parts, therefore, the nuts 17 will first be screwed toward the washers 16, by which in turn the necessary tension will be put on the inner disks and then the terminal nuts 19 will be screwed firmly into place and a corresponding tension put upon the other disks, thus making a rigid and effective combination of all the parts, inasmuch as the inner conical annular disks 10 serve as bracing members for the outer disks 9, and as all four disks are secured to the hub and to the rim, the effect of the central locking mechanism will be to make a very strong wheel having its thin web members entirely in tension.

The construction I have just been describing is shown in Fig. 1 and applies to the driven wheel, commonly the front wheel, and not the one ordinarily equipped with a brake drum, but in Fig. 2 I have delineated an embodiment of the same mechanical members in a form of wheel commonly adapted for use as a rear wheel and containing a brake drum, brake shoes, etc. In Fig. 2, 23 denotes the driving shaft, 24 the ball bearings, 25 the axle, and 25ᵃ the hub cap, which parts are arranged and related in any desired manner. 22 represents the brake drum and hub. The drum is adapted to contain brake parts, as for instance the shoes 26, while the inside opening into the drum is covered by the side disk or plate 27′. The rim 1 is the same as that shown in Fig. 1, wherein a specimen of demountable rim is illustrated consisting of the clencher sections 5, clencher band 6, inner ring 7, clamping rings 40 and a series of removable clamping bolts 8, said inner ring 7 having peripheral flanges 14. The mechanism connecting the rim and the brake drum is similar to that shown in Fig. 1, but consists of smaller parts as the distance between rim and drum is shorter, but the parts are arranged and brought under tension in substantially the same manner. They comprise the outer annular disks 27 bent near the middle part, and the inner conical annular disks 28, the apexes of whose cones meet each other near the middle part of the disks. The inner peripheral edges of the outer disks 27, as well as of the inner disks 28, are riveted or bolted to the flanges 30 on the inner edge of the brake drum 22 by means of suitable rivets or bolts 29, there being washer rings 31 interposed between the heads of the rivets 29 and the adjoining edges of the disks 27, said washer rings 31 being suitably countersunk so that the heads of the rivets 29 may lie therein flush with the outer surfaces of these rings 31. Likewise the outer peripheral edges of the annular rings 27 together with the corresponding outer peripheral edges of the inner conical disks 28 are secured to the flanges 14 of the demountable rim, that is to say, of the inner ring 7 of said rim, by means of a series of rivets or bolts 13, there being interposed between the outer heads of these rivets or bolts and the adjoining face of the ring 27 suitably perforated washer rings 32, which are preferably countersunk to receive the heads of the rivets 13, so that they may lie flush with the surfaces of the washers.

At the apexes of the conical inner disks and the bendings of the outer bent annular disks, I employ the same series of nuts, washers and connecting bolts, as I have shown in Fig. 1, the bolts 15 each having a central collar 15ᵃ which lies between the conical protuberances of the inner annular disks 28, while within said disk, that is to say, on the opposite side thereof from the collar 15ᵃ are washer rings 16, the nuts 17 on bolts 15, while on the outer ends of the bolts 15 are nuts 19 having slots 20 therein and having screw-threaded passages engaging the screw-threaded ends of the bolt 15, there being interposed between the outer heads of these nuts 19 and the adjoining walls of the bent outer annular disks 27, washer rings 21, the operation and effect of these parts being the same as in Fig. 1 in giving the proper tension to the wheel through the thin web members.

Having thus described my invention, what I claim as new and desire to secure by Letters Patent, is:

1. In a tension wheel, the combination with a hub and a rim, of a pair of bent outer disks and a pair of bent inner disks, all of which are secured centrally of the wheel and also at the rim, and tensioning means passing through said disks substantially at middle points of their width in the bending thereof, and comprising screw-threaded bolts carrying adjusting nuts which are capable of being tightened to regulate the tension of the parts.

2. In a wheel, the combination with the central member thereof and the outer rim, of a pair of annular outer disks and a pair of inner annular disks for bracing and stiffening the structure, all of said disks being secured to the central member and also to the rim, and a series of tension devices for regulating the tension of the several parts, the same consisting of screw-threaded bolts passing through the said disks at points substantially midway of their width, and provided with adjustment nuts whereby the tension is regulated.

3. In a wheel, the combination with a central member and a rim, of a pair of bent outer disks, a pair of inner cone-shaped bracing disks, all of said disks being secured at their inner peripheries to the central member, and at their outer peripheries to the rim, and tensioning means for the several disks consisting of a screw-threaded bolt passing through them substantially midway of their width and having thereon washer rings, nuts engaging said washers, and terminal nuts passing through openings in the outer disks, and adapted to keep the tension in said disks.

4. In a wheel, the combination with a central hub construction and an outer rim, of a pair of outer bent annular disks, a pair of inner cone-shaped annular bracing disks, all the disks being secured to the central member and to the rim, and tensioning means consisting of a screw-threaded bolt having a central spacing collar thereon between the conical parts of the inner members, nuts on the bolt on the other side of the inner disks from the spacing collar, and terminal nuts on the bolt passing through the outer disks and engaging the latter, said nuts coöperating with the bolt for producing the proper tension in the several disks.

In testimony whereof I affix my signature.

WILLIAM J. P. MOORE.